United States Patent [19]
Kahkoska et al.

[11] Patent Number: 5,919,248
[45] Date of Patent: Jul. 6, 1999

[54] METHOD AND APPARATUS FOR DETERMINING NETWORK HEALTH AS A FUNCTION OF COMBINED PERCENT UTILIZATION AND PERCENT COLLISIONS

[75] Inventors: James Kahkoska, Colo. Springs; David G. Fish, Monument, both of Colo.

[73] Assignee: Fluke Corporation, Everett, Wash.

[21] Appl. No.: 08/823,574

[22] Filed: Mar. 25, 1997

[51] Int. Cl.[6] .................................................. G06F 13/00
[52] U.S. Cl. .............................. 709/224; 714/4; 379/29
[58] Field of Search ............................. 395/200.54, 181, 395/182.02, 183.01, 200.53; 379/28, 29

[56] References Cited

U.S. PATENT DOCUMENTS

| | | | |
|---|---|---|---|
| 5,107,450 | 4/1992 | Lawrenz ............................. | 395/200.54 |
| 5,121,342 | 6/1992 | Szymborski et al. ............. | 395/200.54 |
| 5,159,685 | 10/1992 | Kung ................................. | 395/183.02 |
| 5,363,493 | 11/1994 | Unverrich .......................... | 395/184.01 |
| 5,365,509 | 11/1994 | Waslh ................................ | 370/245 |
| 5,377,196 | 12/1994 | Godlew et al. .................... | 371/20.1 |
| 5,481,548 | 1/1996 | Wallace ............................. | 371/20.1 |
| 5,644,717 | 7/1997 | Clark ................................. | 395/200.54 |
| 5,664,105 | 9/1997 | Keisling et al. ................... | 395/200.54 |

*Primary Examiner*—Zarni Maung

[57] ABSTRACT

In a test instrument for testing LANs, a method for determining network health is provided. Network health is a composite indicator of the condition of the LAN that is based on a system of rules that take into account both percent utilization and percent collisions to provide for easier interpretation by a test instrument user. The test instrument is coupled to a LAN to receive the link pulse and establish communications. The test instrument receives data traffic from the LAN in the form of frames which are analyzed to produce network information which include the network parameters of percent utilization and percent collisions. Decisions about the network health based are reached by mapping a plurality of network parameters to a decision matrix that is constructed from expert knowledge in the field of local area networks. Messages corresponding to each decision may be displayed which contain network advice to provide guidance as to the nature and location of the problem and suggested steps to solve problems in the LAN.

11 Claims, 5 Drawing Sheets

METHOD AND APPARATUS FOR DETERMINING NETWORK HEALTH AS A FUNCTION OF COMBINED PERCENT UTILIZATION AND PERCENT COLLISIONS

BACKGROUND OF THE INVENTION

This invention relates generally to test instruments for local area networks (LANs) and in particular to a method for determining the relative health of a LAN.

Increasingly complex LANs, or simply "networks", now connect more and more types of devices including personal computers, work stations, file servers, and printers. Network hubs are often the central devices in a network through which information flows. Each client device connects to the LAN via adapters called network interface cards (NICs) to form nodes. Connecting the nodes to the hubs are network links which may consist of unshielded twisted pair (UTP) wire, coaxial cable, or fiber optic cable.

Network protocols for controlling the communication of information between the nodes have been developed, the most common being Ethernet or 10BASE-T which is defined according to the IEEE 802.3 standard. Ethernet has a speed of 10 megabits per second and uses a media access protocol called carrier-sensing multiple access with collision detection (CSMA/CD) to control information traffic flow and resolve collisions between nodes. A node can send information on the network only if no other node is currently sending information. If a node tries to send information at the same time as another node, a collision occurs and each node operates according to a well-defined "back off" procedure to resolve the collision. Each node will wait a random period of time to attempt to send the information again.

Because Ethernet is typically implemented in a baseband, broadcast network, every node receives the information sent by every other node within the collision domain. In order to minimize the burden on the software operating in host personal computers (PC's) connected to the network, a hardware layer with a hardware or media access control (MAC) address passes along to the software layer only the information appropriate for that node. Such information may be in the form of a "broadcast" message intended for all nodes in the network or as a message only for the intended node with the MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between nodes. Information is passed between nodes in the form of discrete packets containing data or control information supplied by the various OSI layers. The highest layers are the Application layer, the Presentation layer, and the Session layer which may include Telnet, File Transfer Protocol (FTP), Simple Mail Transfer Protocol (SNMP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer routes messages back and forth between a source node and a destination node according to Internet Protocol (IP) addresses by adding an IP header to each packet indicating the source and destination IP addresses. The lowest layer is the physical link layer in which the hardware MAC addresses are used.

A test instrument connected to the LAN must display complex network information gathered from the LAN, typically as a selected set of network parameters chosen to best indicate the status of critical parameters. A selected set of network parameters may include the presence of a link pulse, the percent utilization of the network capacity, the percent collisions of the network traffic, and the presence of errors on the LAN. Percent utilization is the percent of the LAN bandwidth consumed by frames, collisions, and ghosts and is often the primary yardstick for measuring overall network performance. Percent collisions is the percent of the used bandwidth consumed by collisions which characterizes how well the network is handling a given volume of traffic.

In prior art test instruments, which also include expert systems for analyzing LANs in the form of a computer operating in combination with a protocol analyzer, allow for analysis of network problems by measuring network parameters. Percent utilization and percent collisions may both be determined but are separately analyzed. However, percent utilization and percent collisions are interrelated because both normal network traffic and traffic generated as a result of collisions both consume limited network bandwidth. Interpreting one network parameter without considering the other network parameter may lead to incorrect conclusions about the overall behavior of the LAN which may collectively be understood as network health.

Network health is a composite indicator of the condition of the LAN that is based on a system of rules that take into account both percent utilization and percent collisions to provide for easier interpretation by a test instrument user. Providing a decision on network health would be particularly useful in service and maintenance applications requiring quick and useful determination of current network conditions by the instrument user. Therefore, it would be desirable to provide a method for determining various degrees of network health based on the interpretation of multiple network parameters.

SUMMARY OF THE INVENTION

In accordance with the present invention, in a test instrument for testing LANs, a method for interpreting selected network parameters, including percent utilization and percent collisions, to produce a decision on network health is provided.

The test instrument, typically implemented in a portable, handheld package for service and maintenance applications, is coupled to a LAN typically via a patch cable to receive the link pulse and establish communications with the LAN. The LAN typically employs the Ethernet media access control protocol to control information traffic flow and resolve collisions in data traffic between nodes. The test instrument receives data traffic from the LAN in the form of frames which are received by a frame processing operation which analyzes the frames to produce network information which includes a selected set of network parameters.

Network health is an overall assessment of the status of the LAN taking into account a variety of network parameters. Network health is determined according to a body of rules that comprise a body of expert opinion on LANs. A "healthy" LAN is one that is has acceptable levels of percent utilization and percent collision. An "unhealthy" or "sick" LAN is one that has unacceptable high level of percent collisions. Various other combinations of percent collisions and percent utilization lead to conclusions on various degrees of network health. Each of the network health decisions has a corresponding message that contains network advice which provides guidance as to the nature of the problem and may suggest steps to handle the problem.

The network information is received by a microprocessor which may store the network parameters or display them on a graphical interface. The network parameters of percent utilization and percent collisions are interrelated because both involve the use of limited network bandwidth. Percent utilization is the percent of the LAN bandwidth consumed by frames, collisions, and ghosts. Percent collisions is the percent of the used bandwidth consumed by collisions.

The method according to the present invention reaches conclusions about the status of the LAN which may be collectively understood as network health using at least two network parameters interpreted according to a set of rules. The network parameters are symbolically mapped onto a decision matrix which is organized according to the set of rules. In the preferred embodiment, percent collisions and percent utilization are mapped to decisions regarding network health. The decision matrix is assembled from expert knowledge derived from those skilled in the field of local area networks in the manner of an expert system. Messages corresponding to each decision may be displayed which contain network advice to provide guidance as to the nature and location of the problem and suggested steps to solve the problem.

One object of the present invention is to provide a method for determining network health.

Another object of the present invention is to provide a method for determining network health in a test instrument using at least two network parameters.

An additional object of the present invention is to provide a test instrument for determining and displaying network health in a local area network.

Other features, attainments, and advantages will become apparent to those skilled in the art upon a reading of the following description when taken in conjunction with the accompanying drawings.

DETAILED DESCRIPTION OF THE INVENTION

Figure 1:
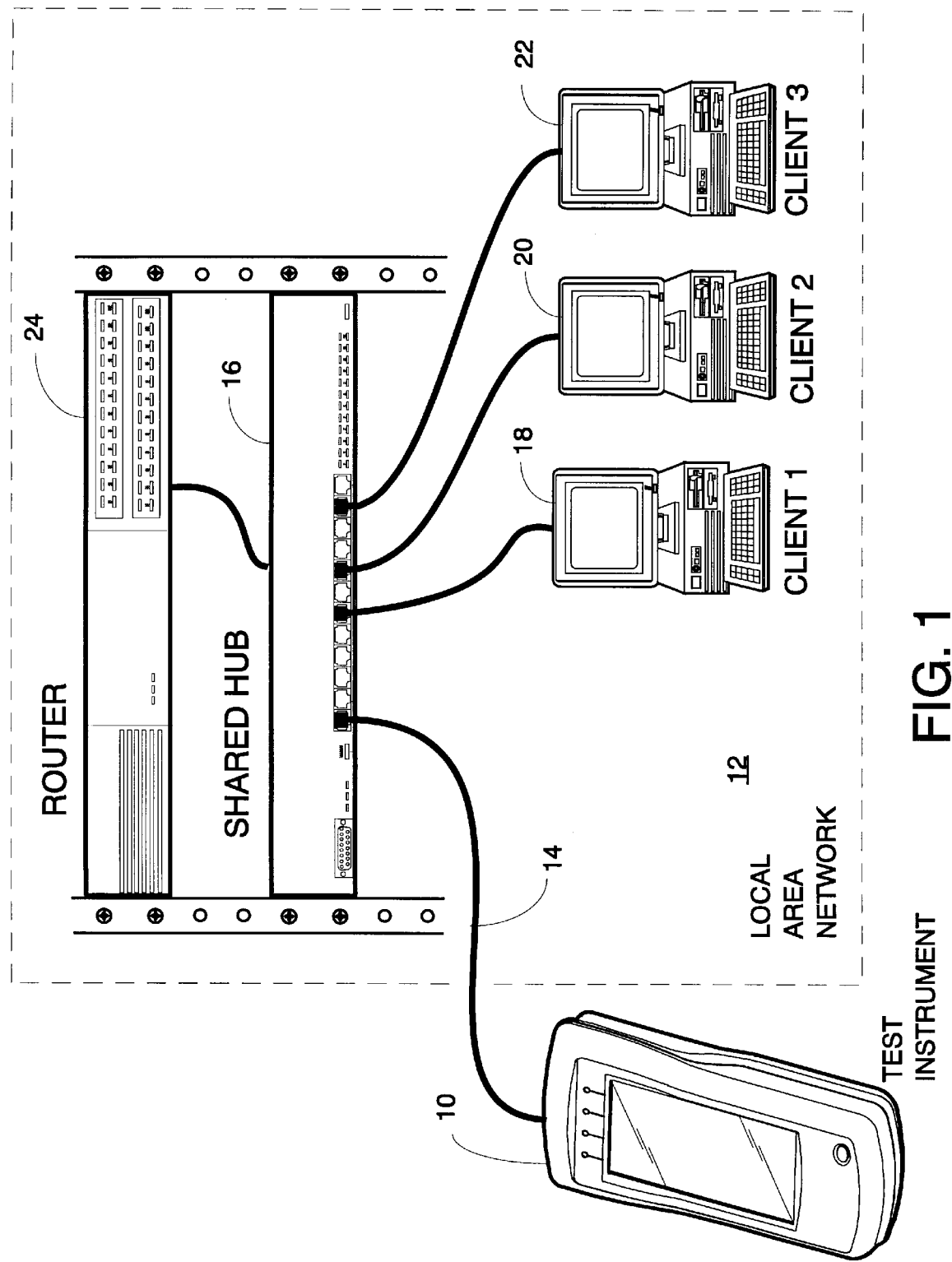
FIG. 1 is a simplified view (not to scale) of a test instrument as applied to testing a local area network.

FIG. 1 is an illustration (not to scale) of a test instrument 10 with a graphical user interface as applied to testing a local area network (LAN) 12. The test instrument 10 is designed to be handheld, portable, and battery-operated, requiring that the user interface be compact, draw relatively little power and capable of displaying relatively complex information. In testing the LAN 12, highly complex network information is acquired and displayed in the form of network parameters by the test instrument 10 which must be interpreted collectively by the user.

As shown, the LAN 12 is typical of what may be encountered by the test instrument 10 which is typically used for service and maintenance of the LAN 12. A shared hub 16 is coupled to devices 18, 20, and 22, labeled CLIENT 1, 2, and 3 respectively, as well as a router 22 to form the LAN 12. The LAN 12 is typically implemented using the Ethernet media access control protocol which provides for a base-band network in which the various network devices communicate with each other using data formatted as frames or packets. The test instrument 10 must be capable of displaying the network parameters in a manner that may be quickly understood by the user, who is often in cramped physical environments where ambient light is poor such as telecommunications closets.

Network parameters from the LAN 12 gathered by the test instrument 10 may include the presence of the link pulse from the shared hub 16, the level of utilization of the LAN 12, the presence of collisions in the traffic between the devices 18, 20, and 22, and the presence of errors on the LAN 12. While displaying network parameters separately on the graphical display is necessary and desirable, the method according to the present invention provides for the determination and display of network health by interpreting a combination of at least two network parameters. In this way, the test instrument 10 provides network advice in the manner of an expert system based on predetermined knowledge of network behavior that has been compiled and stored in a decision matrix and using at least two network parameters.

Figure 2:
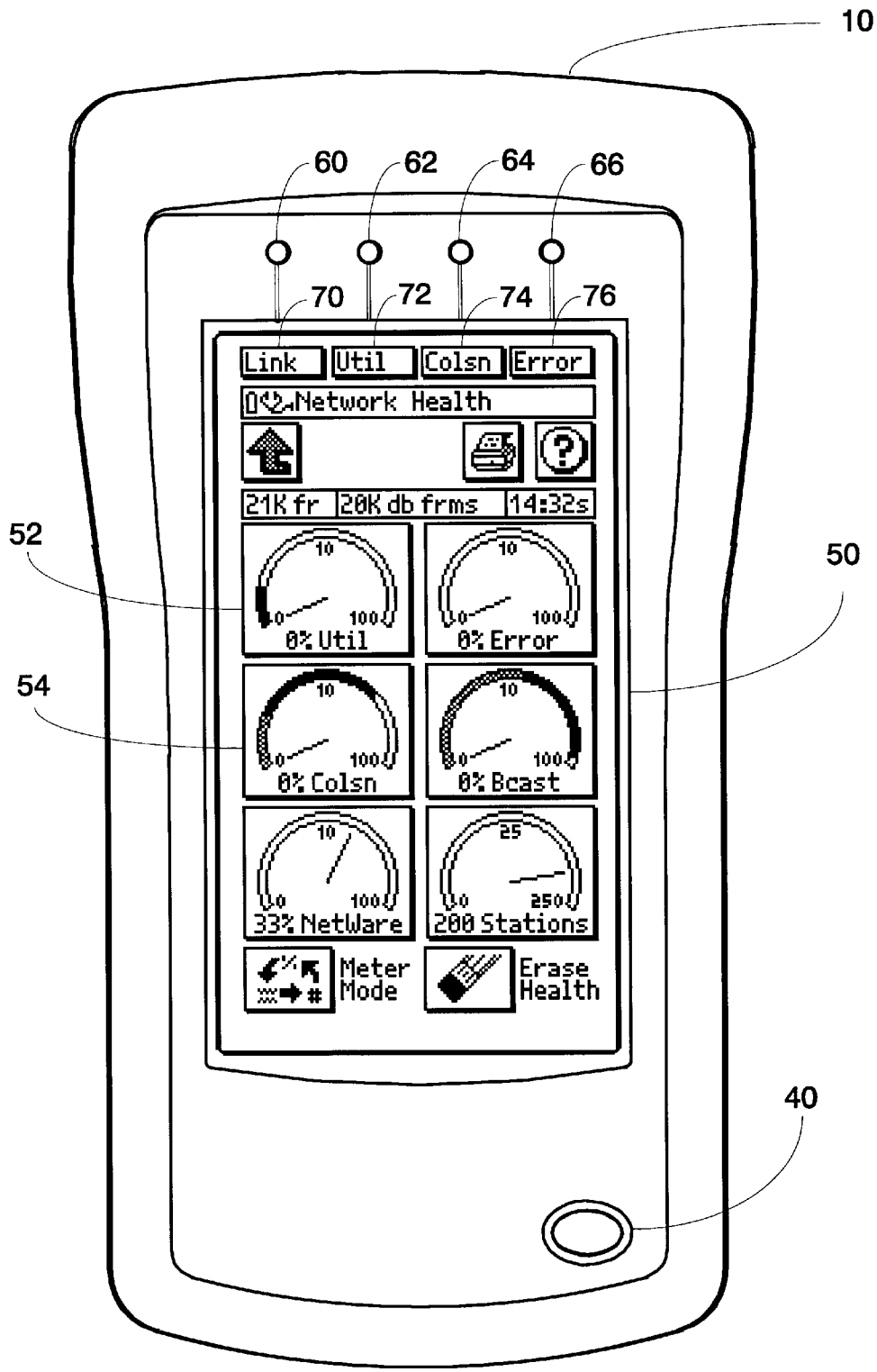
FIG. 2 is a top view of the test instrument of FIG. 1 showing a graphical user interface for displaying network information.

FIG. 2 is a top view of the test instrument 10 showing a graphical interface 50 mounted on an upper surface of the test instrument 10 for displaying a selected set of network parameters. In the preferred embodiment, the graphical interface 50 is comprised of a touchscreen user interface in which user keypresses may be received directly by the graphical interface 50, thereby eliminating separate switches and keys for user input. A row of softkeys 70, 72, 74, and 76 are drawn near the top edge of the graphical interface 50. Indicators 60, 62, 64 and 66 are mounted on the upper surface adjacent to the top edge of the graphical interface 50 and are positioned to physically correspond respectively with the softkeys 70, 72, 74, and 76. Each of the network parameters may be displayed graphically, such as indicators 52 and 54 which display percent utilization and percent collisions on simulated gauges. An on-off switch 40 is mounted on the upper surface to turn the test instrument 10 on and off.

Figure 3:
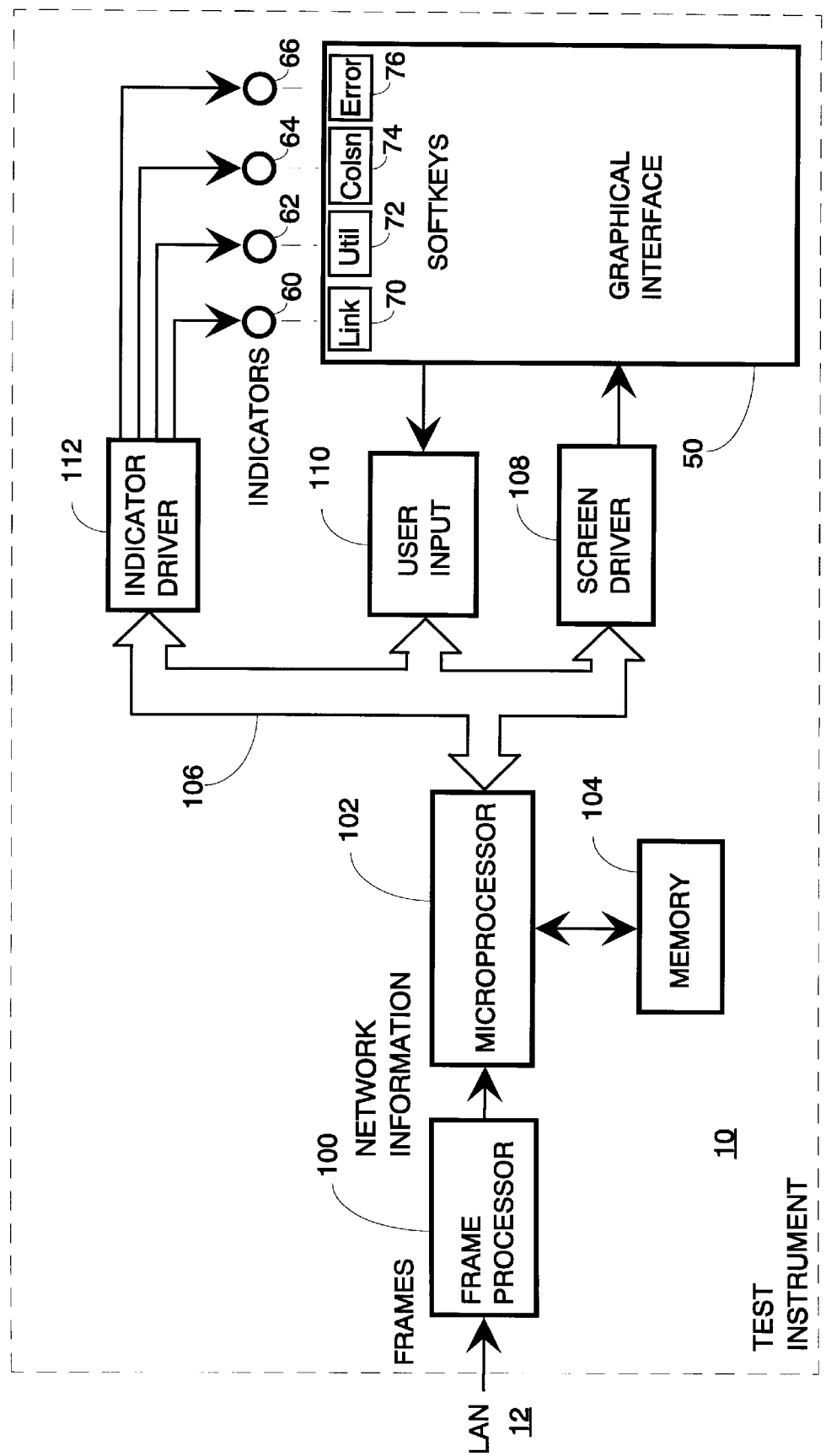
FIG. 3 is a simplified block diagram of the test instrument of FIG. 1.

FIG. 3 is a simplified block diagram of the test instrument 10 showing the operation of the graphical interface 50 and the indicators 60–66 to display the network information from the LAN 12. The test instrument 10 is coupled to the LAN 12 to receive network traffic in the form of frames. The frames are received by a frame processor 100 which generates network information in terms of a selected set of network parameters which include percent collisions, presence of errors, presence of a link pulse, and percent utilization, along with other network information such as the types of devices communicating on the LAN 12 based on the frames received. The frame processor 100 may be implemented in hardware, software, or a combination thereof within the test instrument 10.

The network information generated by the frame processor 100 is received by a microprocessor 102 which executes an instrument control program contained in a memory 104. The network information is typically stored as a database in the memory 104 and then further analyzed by the microprocessor 102. The network information gathered may be displayed to the user in terms of basic information such as on the indicators 60–66, and also via the graphical interface 50 as detailed information in graphical or alphanumeric format. The microprocessor 102 places the detailed information on the graphical interface 50 via a data bus 106 to a screen driver 108 which handles the details of interface formatting and control.

User input may be in the form of keypresses to the graphical interface 50 implemented as a touchscreen display which are received by the microprocessor 102 via the user input 110 which handles the details of interpreting the location of the keypress. Each location must be matched to one of the softkeys 70, 72, 74 and 76 which are drawn as rectangles in order to constitute a valid key press for that softkey. Each of the softkeys 70, 72, 74 and 76 has a label which defines its meaning and the meaning of the associated indicator in terms of network parameters. Other forms of graphical user interface technologies such as cathode ray tubes (CRTs) may be readily implemented for the graphical interface 50.

The microprocessor 102 displays the basic information on the indicators 60–66 via an indicator driver 112. The indicator driver 112 may be implemented in hardware, software, or a combination thereof in order to provide electrical signals to activate each of the indicators 60–66 with the desired colors. The indicators 60–66 are preferably updated at a rate that is high enough so that the status of each indicator appears to resemble a "real time" viewing of the selected parameters as they occur on the LAN 12. The indicator driver 112 allows the indicators 60–66 to operate essentially in parallel and independently of one another so that multiple selected parameters may be visually interpreted in combination by the user.

The method according to the present invention provides for the generation of a decision regarding network health based on at least two network parameters which are mapped onto a decision matrix to determine a decision on network health. The network health may then be determined according to a software program stored in the memory 104 and executed by the microprocessor 102. Network health may be determined either in response to a user input requesting an interpretation of network health or automatically alongside the network parameters. The decision regarding network health is preferably displayed as a corresponding text message on the graphical interface 50 which provides further analysis of network health, along with network advice on how to proceed in locating and solving problems.

Figure 4:
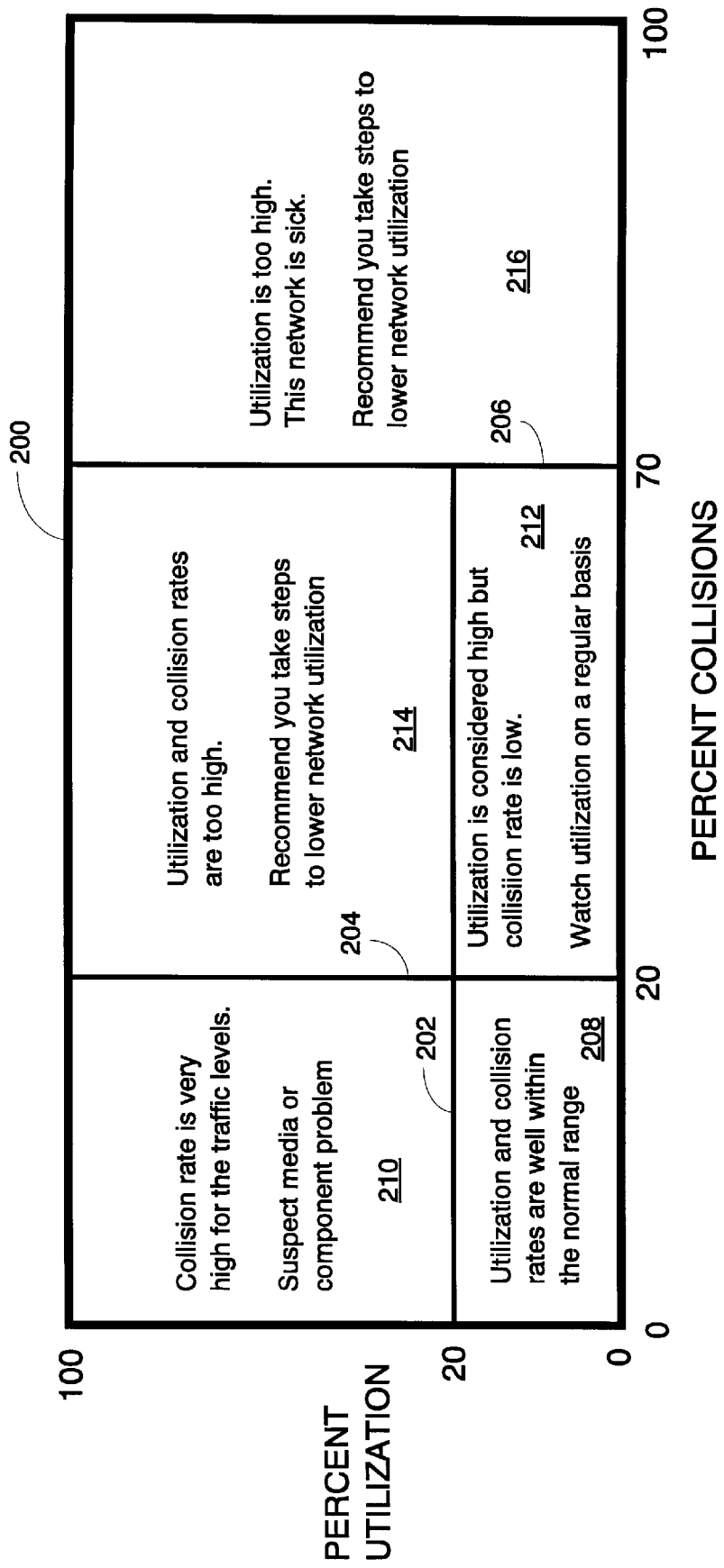
FIG. 4 is a two-dimensional matrix mapping percent utilization and percent collisions to a set of decisions according to the present invention.

FIG. 4 shows a two-dimensional decision matrix 200 (not to scale) for mapping the network parameters of percent utilization and percent collisions to a set of decisions. Percent collisions, scaled from 0 to 100%, forms the vertical axis and percent utilization, scaled from 0 to 100%, forms the horizontal axis. A dividing line 202 is shown at 20% along the percent collisions axis, along with dividing lines 204 and 206 at 20% and 70% along the percent utilization axis. Decisions 208–216 are formed between the dividing lines 202–206 on network health which prompt messages to be displayed to the user regarding network health, along with network advice on how to proceed in locating and solving problems.

The decisions 208–216 and the dividing lines 202–206 are formed according to expert knowledge of the behavior of the LAN 12 that has been developed in terms of the network parameters of percent utilization and percent collisions. Such expert knowledge may be derived from those skilled in the field of LANs generally and more particularly in the area of analysis and diagnosis of LANs by interpretting a combination of network parameters. The decision matrix 200 may be readily adapted according to accommodate improved expert knowledge of the behavior of LAN 12, the substitution of different network parameters, and the consideration of increased numbers of network parameters.

The decision 208 having the message "Utilization and collision rates are well within the normal range" is reached when percent utilization is less than 20% and percent collisions is less than 20%. The levels for the dividing lines 202 and 204 along with the content of the message were derived from the expert knowledge in the field of local area networks for what would be considered a normal, "healthy" LAN 12.

The decision 210 having the message "Collision rate is very high for the traffic levels. Suspect media or component problem" is reached when percent utilization is less than 20% and percent collisions is greater than 20%. Now, an actual problem has been detected based on a level of collisions that is considered too high for the relatively low level of utilization based on expert knowledge in the field of local area networks as stored in the decision matrix 200. The message includes network advice to look for the problem in the network media or components.

The decision 212 having the message "Utilization is considered high but collision rate is low. Watch utilization on a regular basis" is reached when percent utilization is between 20% and 70% and percent collisions is less than 20%. Now, a potential problem has been detected based on a level of utilization that is considered high although the LAN is handling the load satisfactorily with a relatively low collision rate based on expert knowledge in the field of local area networks as stored in the decision matrix 200. The message includes network advice to regularly monitor the percent utilization.

The decision 214 having the message "Utilization and collision rates are too high. Recommend you take steps to lower network utilization" is reached when percent utilization is between 20% and 70% and percent collisions is greater than 20%. Now, an actual problem has been detected based on levels of utilization and errors that is considered high based on expert knowledge in the field of local area networks as stored in the decision matrix 200. The LAN 12 is not handling the load satisfactorily based on the high collision rate. The message includes network advice to take steps to lower the utilization rate.

The decision 216 having the message "Utilization is too high. This network is sick. Recommend you take steps to lower network utilization" is reached when percent collisions is over 70%, regardless of the utilization rate. Now, an actual problem has been detected based on a level of collisions that is considered too high for any type of normal operation of the LAN 12 based on expert knowledge in the field of local area networks as stored in the decision matrix 200. The message includes network advice to take steps to lower the utilization rate.

Figure 5:
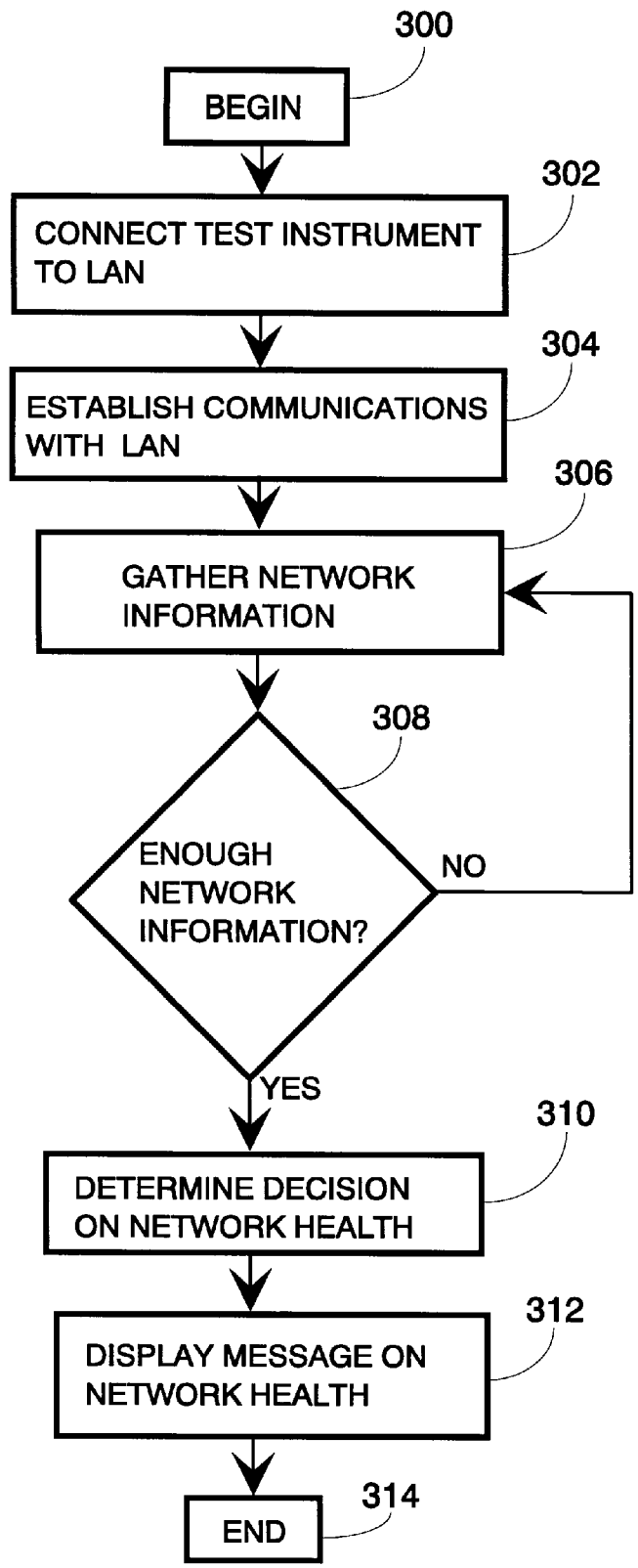
FIG. 5 is a flow diagram of a method of determining network health according to the present invention.

FIG. 5 shows a flow diagram of the method of determining network health as implemented in the test instrument 10. Step 300 labeled BEGIN starts the method of determining network health according to the present invention.

In step 302 labeled CONNECT TEST INSTRUMENT TO LAN, the test instrument 10 (shown in FIG. 1) is coupled to the LAN 12 via the patch cord 14.

In step 304 labeled ESTABLISH COMMUNICATIONS WITH LAN, the test instrument 10 acquires a link pulse and establishes communications with the shared hub 16 on the other end of the link in the well-known manner. Establishing communications is necessary in most circumstances so that the shared hub 16 or other network device will forward frames from the rest of the LAN 12 to the test instrument 10.

In step 306 labeled GATHER NETWORK INFORMATION, the test instrument 10 monitors the data traffic which appears as frames on the LAN 12. The frames are processed to produce network information as they are received and provided to the microprocessor 102. The microprocessor 102 in turn produces the selected set of network parameters from the network information, including the percent collision and percent utilization.

In step 308 labeled ENOUGH NETWORK INFORMATION?, a decision is reached whether to continue gathering network information. Network information is meaningful only when enough has been gathered to characterize network health with the desired level of accuracy using the network parameters. This time period may vary depending on the nature of the activity on the particular LAN but may be determined with a reasonable amount of experimentation. The measurement may also continue, with the network information gathered on a continual basis while the network health is determined and then updated over time.

In step 310 labeled DETERMINE DECISION ON NETWORK HEALTH, a decision is reached on network health based on a plurality of network parameters. In the preferred embodiment, the decision is based on percent utilization and percent collisions. The network parameters are mapped onto the decision matrix 200 to determine one of the decisions 208–216. The network health may be determined responsive to a prompt such as a keypress by the user who is reacting to the network parameters as displayed on the graphical interface 50 or indicators 60–66. The network health may also be displayed automatically alongside the network parameters on the graphical display 50.

In step 312 labeled DISPLAY MESSAGE ON NETWORK HEALTH, the message corresponding to the decision determined in step 310 may be displayed on the graphical display 50, typically in text format. The message may contain an analysis of the status of the LAN 12 and network advice on the nature of the problem detected and suggested steps to solve it.

In step 314 labeled END, the process of determining network health terminates but may be readily re-started or operated continuously as desired.

It will be obvious to those having ordinary skill in the art that many changes may be made in the details of the above described preferred embodiments of the invention without departing from the spirit of the invention in its broader aspects. For example, the decision matrix 200 may be readily modified to add additional network parameters as independent variables to create an n-dimensional matrix according to expert knowledge of the behavior of the LAN 12 that has been developed in terms of the additional network parameters. Greater or fewer numbers of decisions and dividing lines may be used, depending on the type and sophistication of decisions and network advice that need to be conveyed. The contents of the messages and the levels of the dividing lines 202–206 of each of the decisions 208–216 may be readily changed as the expert knowledge changes. A multiple level analysis of the status of the LAN 12 in which the user of the test instrument 10 is guided through a more complete analysis and troubleshooting sequence using a series of decisions responsive to the selected set of network parameters may be readily created in the manner of an expert system. Therefore, the scope of the present invention should be determined by the following claims.

What we claim as our invention is:

1. In a test instrument for testing a local area network, a method for determining network health, comprising:

(a) connecting said test instrument to said local area network;

(b) establishing communication with said local area network;

(c) gathering network information from said local area network, said network information including percent utilization and percent collisions;

(d) determining a decision on said network health based on a combination of said percent utilization and percent collisions; and (e) displaying a message corresponding to said decision.

2. In a test instrument for testing a local area network, a method for determining network health according to claim 1 further comprising determining said decision by mapping said percent utilization and percent collisions onto a decision matrix.

3. In a test instrument for testing a local area network, a method for determining network health according to claim 2 wherein said decision matrix is constructed based on expert knowledge.

4. In a test instrument for testing a local area network, a method for determining network health according to claim 1 wherein said message contains network advice.

5. In a test instrument for testing a local area network, a method for determining network health, comprising:

(a) connecting said test instrument to said local area network;

(b) establishing communication with said local area network;

(c) gathering network information from said local area network, said network information including percent collisions and percent utilization;

(d) determining said decision by mapping said percent collisions and said percent utilization onto a decision matrix; and (e) displaying a message corresponding to said decision.

6. In a test instrument for testing a local area network, a method for determining network health according to claim 5 wherein said decision matrix is constructed based on expert knowledge.

7. In a test instrument for testing a local area network, a method for determining network health according to claim 5 wherein said message contains network advice.

8. A test instrument for determining network health of a local area network, comprising:

(a) a frame processor for coupling to said local area network to receive frames, said frame processor gathering network information from said frames;

(b) a memory for storing a decision matrix;

(c) a microprocessor coupled to said frame processor to receive said network information and to said memory, said network information containing percent utilization and percent collisions, wherein said microprocessor determines a decision on said network health by mapping said percent utilization and percent collisions on said decision matrix; and (d) a display for displaying a message corresponding to said decision.

9. A test instrument in accordance with claim 8 wherein said decision matrix is constructed based on expert knowledge.

10. A test instrument in accordance with claim 8 wherein said displayed message contains network advice.

11. A test instrument in accordance with claim 8 wherein said decision matrix is constructed is constructed with percent collisions ordered from zero to one hundred along one axis and percent utilization ordered from zero to one hundred along a second axis so that decision sectors on said decision matrix correspond to combinations of percent collisions and percent utilization.

* * * * *